US006256581B1

(12) United States Patent
Fujii et al.

(10) Patent No.: US 6,256,581 B1
(45) Date of Patent: Jul. 3, 2001

(54) NAVIGATION METHOD, DEVICE, SYSTEM AND COMPUTER READABLE MEDIUM

(75) Inventors: Kensaku Fujii, Yokohama; Kazuhiro Sugiyama, Chiba, both of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/362,391

(22) Filed: Jul. 28, 1999

(30) Foreign Application Priority Data

Jul. 30, 1998 (JP) .................................................. 10-215018

(51) Int. Cl.$^7$ .................................................. G01C 21/26
(52) U.S. Cl. ........................... 701/202; 701/200; 701/201
(58) Field of Search .................................... 701/200–202, 701/207–216; 707/100, 103, 104

(56) References Cited

U.S. PATENT DOCUMENTS 5,953,722 * 9/1999 Lampert et al. ..................... 707/100

FOREIGN PATENT DOCUMENTS

| 5-334373 | 12/1993 | (JP) . |
| 6-294659 | 10/1994 | (JP) . |
| 7-146998 | 6/1995 | (JP) . |
| 7-160982 | 6/1995 | (JP) . |
| 9-318381 | 12/1997 | (JP) . |
| 10-105888 | 4/1998 | (JP) . |

* cited by examiner

Primary Examiner—Bernarr E. Gregory
(74) Attorney, Agent, or Firm—Kenyon & Kenyon

(57) ABSTRACT

A navigation method for guiding a user from a present position to a destination position includes inputting the present position and the destination position, inputting data from a geographic database and a road network database and selecting a route from the present position to the destination position, determining particularity of route guide map according to the area and the density of data representing the selected route, selecting necessary data for guiding a user according to the particularity and generating the route guide map, inputting data corresponding to the area from a spatial object network database and generating route guide sentence with respect to the route guide map, and manipulating information in the route guide map and route guide sentence and outputting the manipulated information.

17 Claims, 17 Drawing Sheets

SPATIAL OBJECT

TASK A
 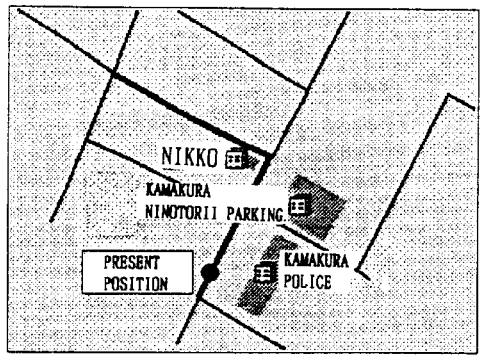
FIG. 14A  FIG. 14B
TASK B
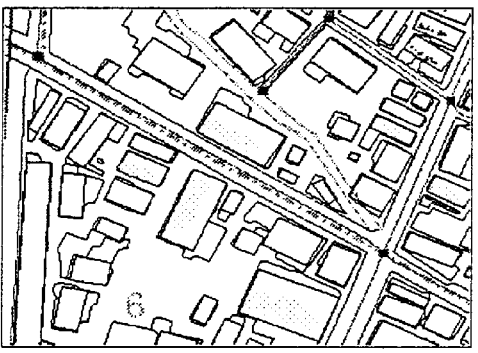 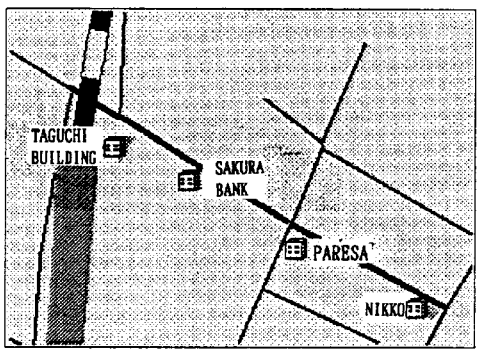
FIG. 14C  FIG. 14D
TASK C
 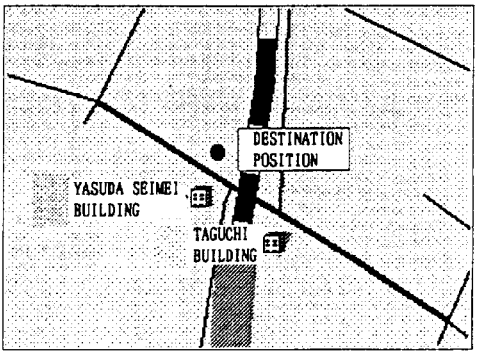
FIG. 14E  FIG. 14F

NAVIGATION METHOD, DEVICE, SYSTEM AND COMPUTER READABLE MEDIUM

BACKGROUND OF THE INVENTION

1. Field of the Invention

The present invention generally relates to a field of navigation for guiding a user to a destination, and more particularly to a method, a device and a system which automatically generate route guide map and route guide sentence for obtaining clear route information.

2. Description of the Related Art

Conventionally, starting with a car navigation system, there has been a variety of navigation systems. As representative examples, a map-guiding-type navigation system which uses route information by visual map and a voice-guiding-type navigation system which carries out navigation by route information by voice instead of visual map or by route information by voice in combination with visual map are known.

As map-guiding-type navigation systems, for example, there are a car navigation system and a portable terminal which navigates with a geographic database and a GPS system. In order to realize such a map-guiding-type navigation system, it is necessary that a device of a user includes route information by visual map and superimposes the present position of the user which is detected by a GPS system or the like on the map information. In addition, it is necessary that the device includes all geographic data for a user's necessity and the geographic data should always be kept up-to-date. Thus, for example, a technology in which the geographic data can be obtained from a communications satellite such that the user does not have to worry about the data capacity of the device is proposed in Japanese laid-open patent application No.6-294659 "MAP DISPLAY DEVICE". In addition, a method in which the map information is compressed so as to decrease an amount of data to be transmitted is proposed in Japanese laid-open patent application No.7-160982 "INSTRUCTION MAP TRANSMISSION SYSTEM".

On the other hand, as voice-guiding-type navigation systems (including the type in combination with the route information by visual map), for example, there are a car navigation system which has a voice guidance capability and a telephone guidance system and the like. In order to realizing the above systems, it is necessary to generate a route guide sentence from the present position of the user and from the geographic data.

Thus, for example, a technology in which a right turn or a left turn or the like according to a turning angle of a selected route is instructed is proposed in Japanese laid-open patent application No.7-146998 "DRIVING LOCATION DISPLAYING DEVICE HAVING VOICE GUIDANCE DEVICE", and a technology for navigating by a driving road name and a place name in the moving direction is proposed in Japanese laid-open patent application No.10-105888 "NAVIGATION DEVICE HAVING VOICE GUIDANCE". In addition, a technology for navigating by a distance from a starting point to a destination, the direction, a target and the like is proposed in Japanese laid-open patent application No.5-334373 "TELEPHONE NAVIGATION DEVICE". Further, in Japanese laid-open patent No.9-318381 "ROUTE GUIDANCE DEVICE", a technology is proposed in which route information by voice is performed by setting an intersection as a guiding point beforehand, and, in the technology, a three-dimensional image for route information is displayed by extracting landmarks from public service facilities such as a public office, a hospital and a school which are indicated by map symbols in geographic data, or from a gas station, a convenience store, a bank and the like. Then, acoustic information (for example, music such as a commercial song) which reminds the user of the landmarks is output.

However, according to the conventional map-guiding-type navigation system, the time for transmission of the geographic data is long because the data amount is very large even if it is compressed. Further, it is difficult to use the geographic data effectively by displaying the route information as it is, because the display size and the resolution of a terminal are generally limited for displaying an image clearly.

In addition, according to the conventional voice-guiding-type navigation system, the system generally relies upon the route information by visual map which coexists with the route information by voice. That is, the system can output only such a representation as a moving direction on a road. Hence, it is difficult to generate effective route guide sentence for complementing the route information. Further, it is difficult to grasp such information which is defined by absolute coordinates as a distance, a direction and the like unless the user is adapted to the place. Furthermore, even when a target such as a landmark is displayed, it is difficult to grasp the information if the landmark is specified independently.

As mentioned above, automatic generation of such route guide map and route guide sentence is not realized currently, and the task for the generation may require manpower, and considerable time and experience. Therefore, there are strong demands for labor-saving and automatization for the generation.

SUMMARY OF THE INVENTION

It is an object of the present invention to provide a method, a device and a system which automatically generate a route guide map and a route guide sentence for clearly guiding a user to a destination.

The present invention can solve the above-mentioned objective by the following features.

A navigation method for guiding a user from a present position to a destination position according to a first aspect of the present invention includes the steps of:

inputting information on the present position and the destination position;

inputting data from a geographic database and a road network database with respect to the information and selecting a route from the present position to the destination position;

determining particularity of route guide map according to the area and the density of data representing the selected route, selecting necessary data for guiding a user to the destination position according to the particularity and generating the route guide map;

inputting data corresponding to the area from a spatial object network database and generating route guide sentence with respect to the route guide map, and manipulating information in the route guide map and route guide sentence and outputting the manipulated information.

A method for generating route guide information for guiding a user from a present position to a destination position according to a second aspect of the present invention includes the steps of:

extracting the present position and destination position from a guide condition;

inputting data from a geographic database and a road network database with respect to the information and selecting nodes and links on a route which is selected from the present position to the destination position;

calculating an angle between two connected links and classifying each link of the two connected links as a separate task, and generating the route guide information for each separate task.

A navigation device for guiding a user from a present position to a destination position according to a third aspect of the present invention includes, a unit for inputting information on the present position and the destination position;

a unit for inputting data from a geographic database and a road network database with respect to the information and selecting a route from the present position to the destination position;

a unit for determining particularity of route guide map according to the area and the density of data representing the selected route, selecting necessary data for guiding a user to the destination position according to the particularity and generating the route guide map;

a unit for inputting data corresponding to the area from a spatial object network database and generating a route guide sentence with respect to the route guide map, and a unit for manipulating information in the route guide map and route guide sentence and outputting the manipulated information.

A navigation system for guiding a user from a present position to a destination position according to a fourth aspect of the present invention includes a navigation device, a network which is connected to the navigation device, and a plurality of terminals which can be connected to the network, the navigation device including:

a unit for selecting a route from the present position to the destination position by receiving input from the terminal;

a unit for determining particularity of a route guide map according to the area and the density of data representing the selected route, selecting necessary data for guiding a user to the destination position according to the particularity and generating the route guide map;

a unit for generating route guide sentence with respect to the route guide map, and a unit outputting the route guide map and the route guide sentence.

A computer readable medium storing program code for causing a computer to perform navigation for guiding a user from a present position to a destination position according to a fifth aspect of the present invention includes:

program code means for inputting information on the present position and the destination position;

program code means for inputting data from a geographic database and a road network database with respect to the information and selecting a route from the present position to the destination position;

program code means for determining particularity of route guide map according to the area and the density of data representing the selected route, selecting necessary data for guiding a user to the destination position according to the particularity and generating the route guide map;

program code means for inputting data corresponding to the area from a spatial object network database and generating route guide sentence with respect to the route guide map, and program code means for manipulating information in the route guide map and route guide sentence and outputting the manipulated information.

According to the present invention, only necessary data for guiding a user to the destination position is selected from input data so as to simplify the route guide map, and misleading information can be decreased as much as possible. Further, since detailed route guide map for an area close to the destination or for a heavily built-up area in which the user tends to get lost can be generated, the user can clearly grasp the route information.

Further, according to the present invention, since the route guide sentence includes the moving direction and the spatial relationship between the spatial objects which may be landmarks, and since guidance can be performed by both of the route guide map and the route guide sentence, the route can be grasped effectively and the possibility of choosing a false route can be decreased.

Further, since navigation is carried out by both of the route guide map and the route guide sentence so as to complement each other, the route can be grasped effectively and the possibility of choosing a false route can be decreased.

In addition, since the route guide map can be complemented by the route guide sentence, the amount of output data can be decreased as compared with outputting only detailed route information by visual map.

Furthermore, a navigation system can be realized by using a device which has the above-mentioned effects. Moreover, when the processes of the present invention are carried out by a computer, homogeneous output quality can be maintained, and a computer in which the program of the invention is installed can be used as the navigation device of the present invention.

Other features and advantages of the present invention will become apparent from the following description taken in conjunction with the accompanying drawings.

BRIEF DESCRIPTION OF THE DRAWINGS

FIGS. 14A–14F are diagrams showing the result of the route guide map generation process shown in FIG. 2 by using actual data;

DETAILED DESCRIPTION OF THE PREFERRED EMBODIMENTS

Figure 1:
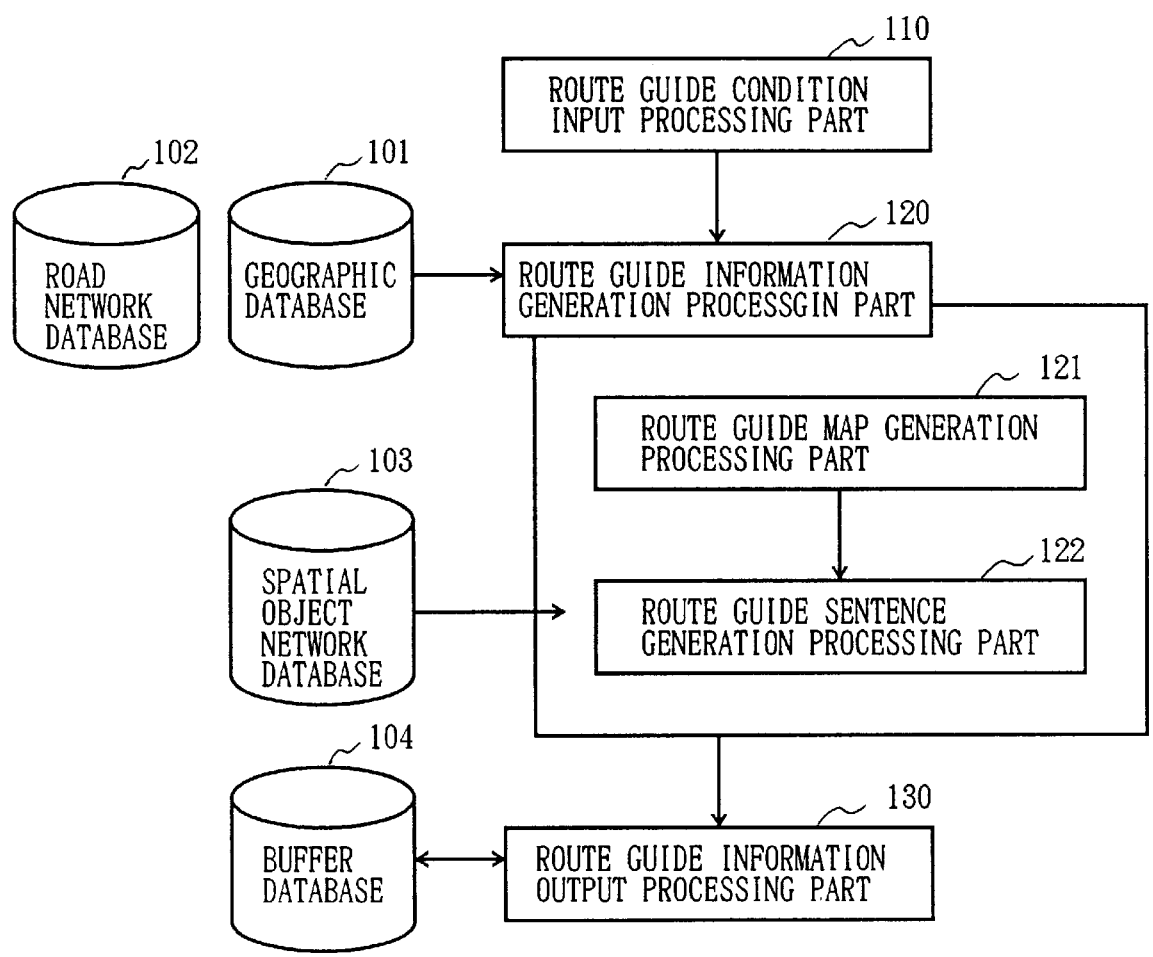
FIG. 1 is a block diagram showing a navigation device according to an embodiment of the present invention.
Figure 2:
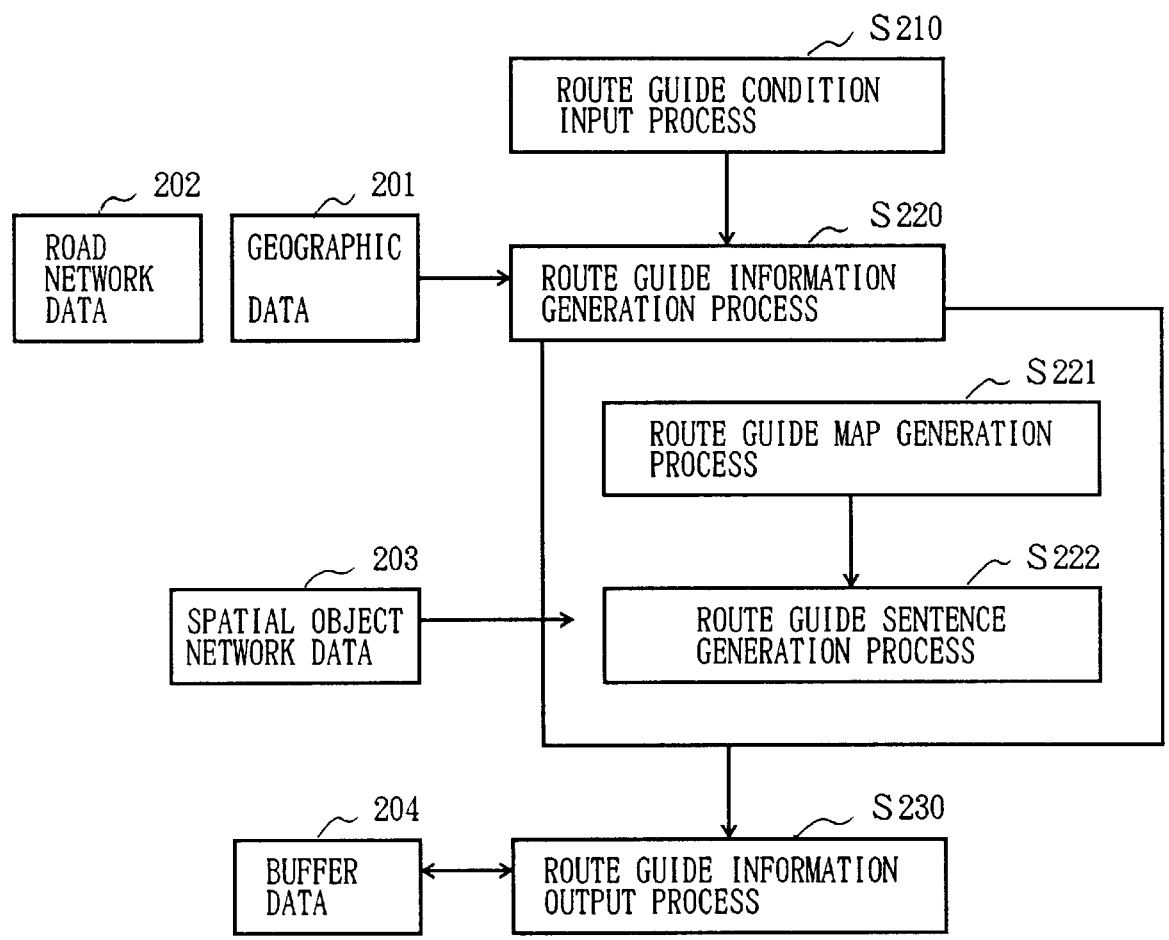
FIG. 2 is a diagram showing processes of each part shown in FIG. 1.

FIG. 1 is a block diagram showing the configuration of a navigation device according to an embodiment of the present invention. FIG. 2 is a flow diagram showing processes performed in each part shown in FIG. 1.

The device includes three parts, which are a route guide condition input processing part 110, a route guide information generation processing part 120, and a route guide information output processing part 130.

The route guide condition input processing part 110 receives a request from a user and performs a process. The route guide information generation processing part 120 has a route guide map generation processing part 121 and a route guide sentence generation processing part 122. The route guide map generation processing part 121 receives data from a geographic database 101 and a road network database 102 based on the results in the route guide condition input processing part 110, performs a process, and performs a route guide map generation process on the basis of the result of the process. The route guide sentence generation processing part 122 receives data from a spatial object network database 103 and performs a route guide sentence generation processing on the basis of the result in the route guide map generation processing part 121.

The geographic database 101 includes geographic position data and attributes of the figures existing in a map. The attributes includes inhabitant information such as a name, an address, a telephone number, an attribute type and so on. The road network database 102 includes link and node data which indicate a network of a road. In addition, the spatial object network database 103 includes spatial relationship of the positions of spatial objects, and includes data which indicates a network between adjacent spatial objects. The spatial object network data may be obtained by a method disclosed in Japanese laid-open patent application No.10-198791 "METHOD FOR AUTOMATICALLY OBTAINING SPATIAL OBJECT NETWORK AND DEVICE". An overview of the method is as follows.

First, geographic data and road network data within the confines of the target area are extracted from the geographic database and the road network database, and a block formed by links with respect to the extracted data is extracted, and, then, spatial objects contained in the block are extracted. Second, one or more reference links are extracted with respect to adjacent relations of the extracted spatial objects. If the number of the links is two or more, the reference link is determined according to the distance to each link from the spatial objects. Third, coordinate axes for identifying the relations of the positions of the spatial objects on the basis of the reference link are set, and spatial objects adjacent to the extracted spatial objects with respect to the coordinate axes are extracted. Finally, the relations of the positions of the adjacent objects are checked, and a spatial object network is obtained by correcting any contradicting relations of the positions of the spatial objects.

The route guide information output processing part 130 performs a process on the basis of the result of the process by the route guide information generation processing part 120, and stores the generated information in a buffer database 104, and outputs only necessary information which is requested by the user.

The embodiments of the above processes in each processing part will be described with reference to FIG. 2.

In the route guide condition input process S210, a present position, a destination position and an output format are set with respect to input from the user. In this process, it is determined whether the input is included in route guide information which has been generated or not, and, if included, the route guide information corresponding to the input is extracted from buffer data 204 and the route guide information output process S230 will be performed. If not included, the route guide information generation process S220 is performed.

In the route guide information generation process S220, route guide map for guiding the user along the route is generated by the route guide map generation process S221 with respect to the present position and the destination position set by the route guide condition input process S210, and route guide sentence for guiding the user along the route is generated by the route guide sentence generation process S222 with respect to the present position and the destination position set by the route guide condition input process S210.

In the route guide information output process S230, the guide information generated by the process S220 is converted to the output format set by the process S210 and is output.

Figure 3:
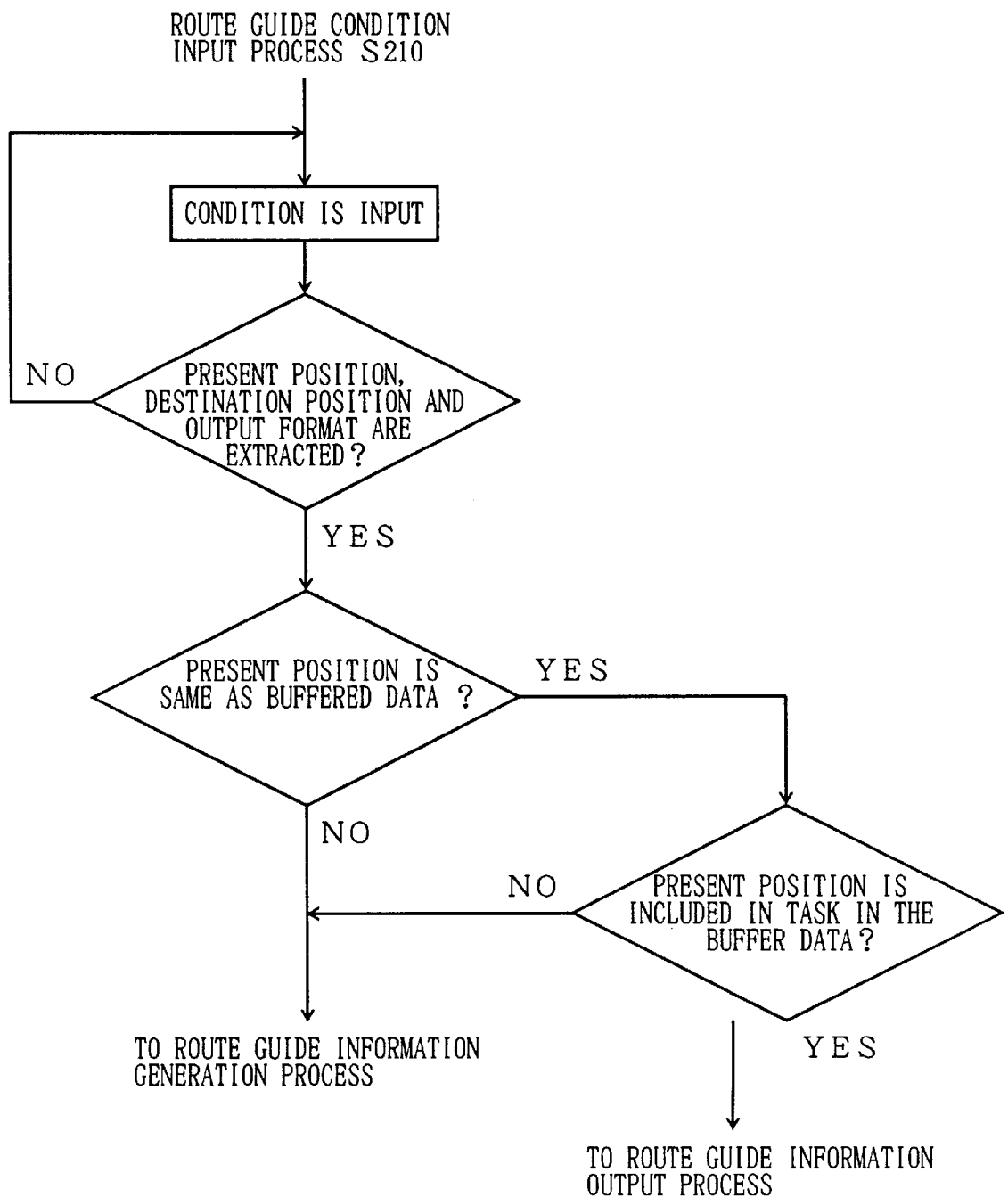
FIG. 3 is a flow diagram for explaining a route guide condition input process shown in FIG. 2.
Figure 6:
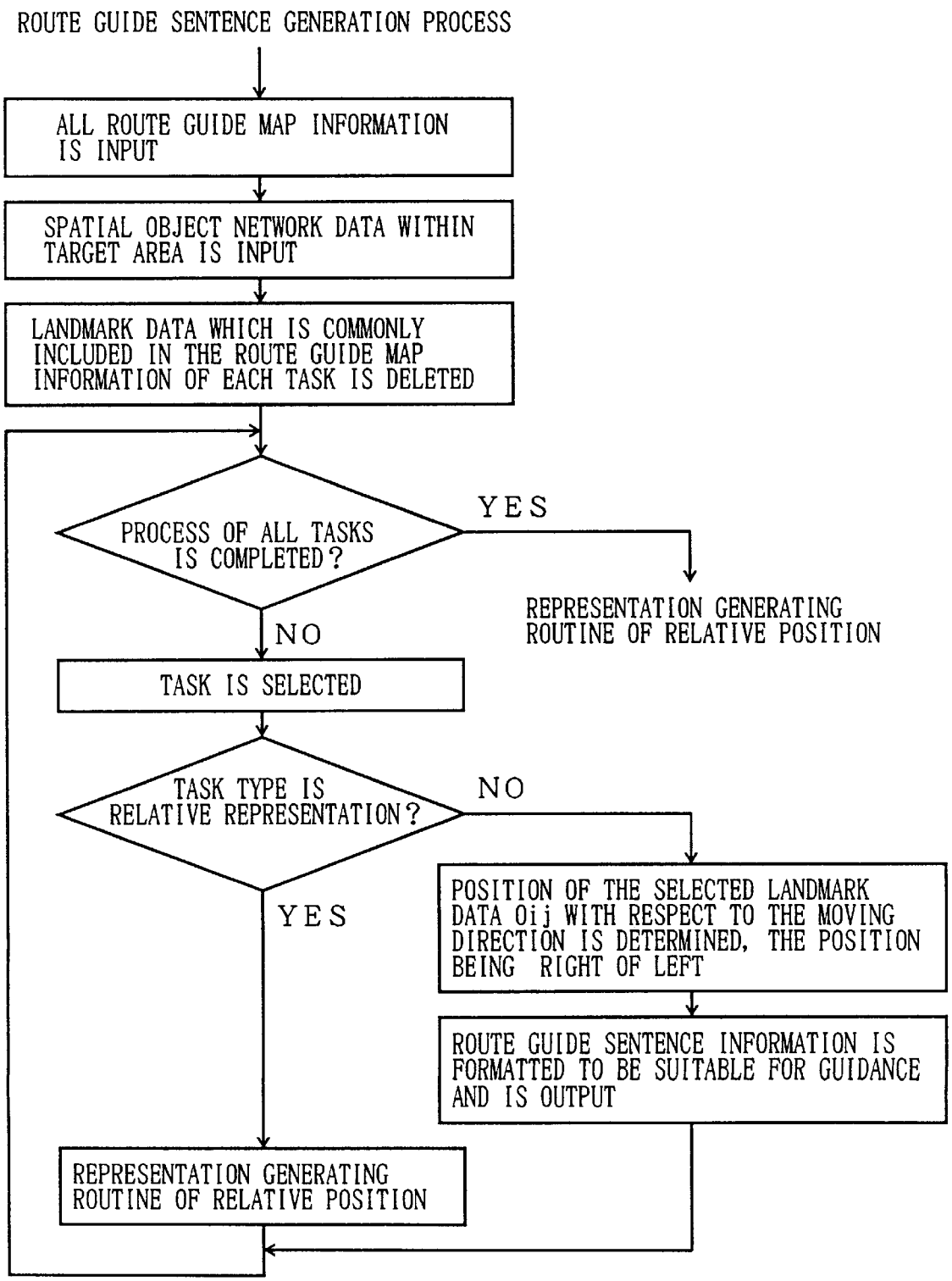
FIG. 6 is a flow diagram for explaining a route guide sentence generation process shown in FIG. 2.
Figure 7:
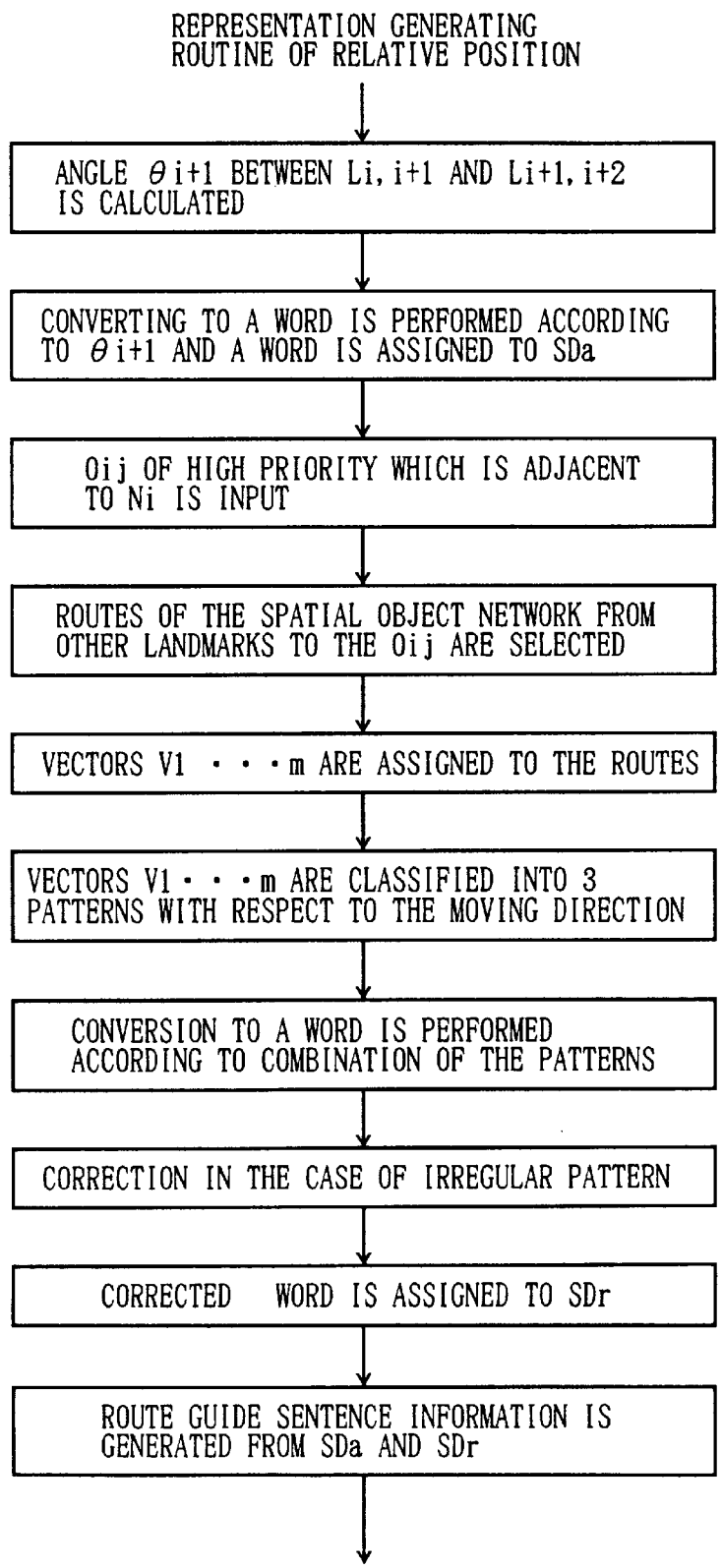
FIG. 7 is a flow diagram for explaining a representation generating routine of relative position shown in FIG. 6.
Figure 8:
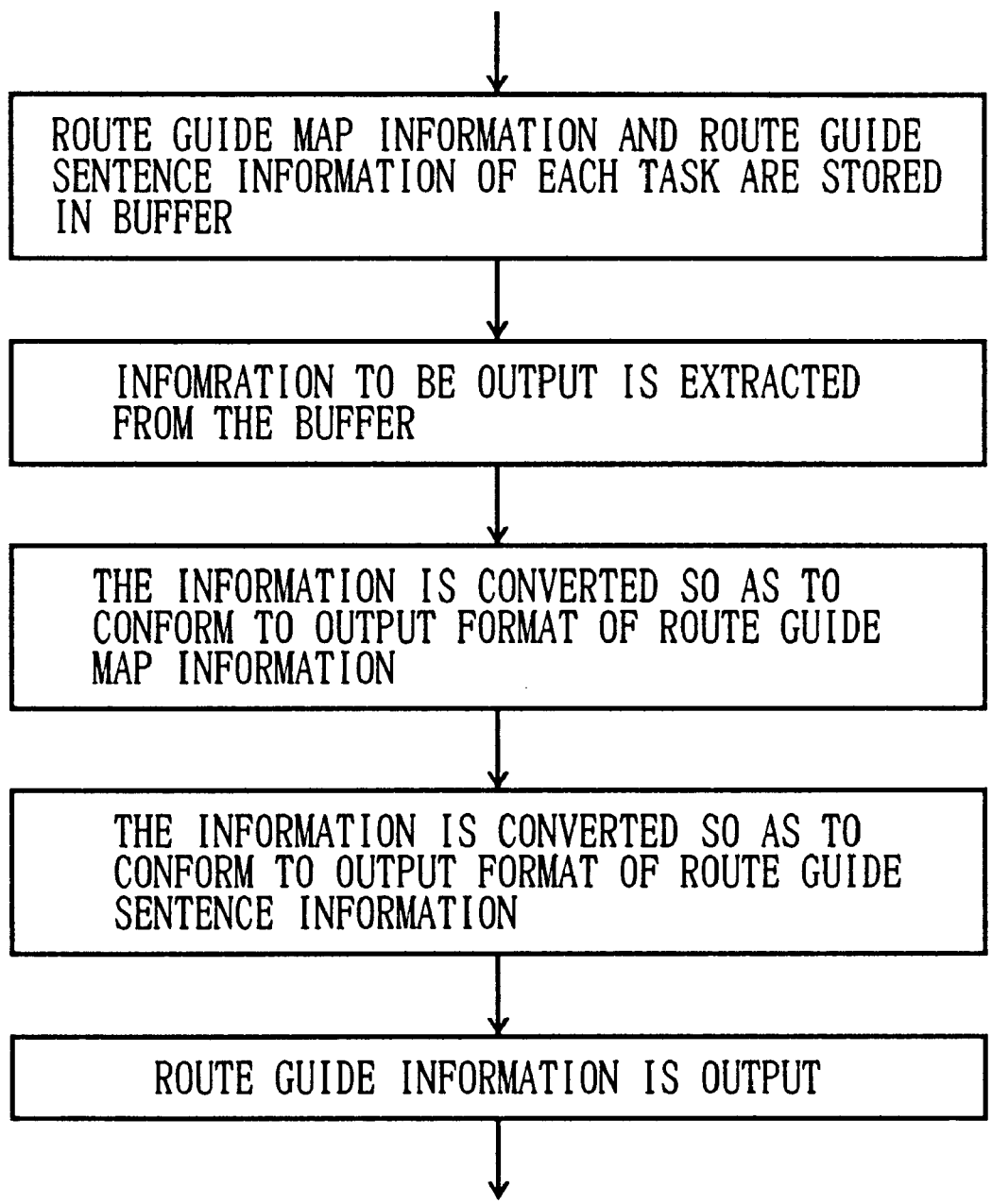
FIG. 8 is a flow diagram for explaining a route guide information output process shown in FIG. 2.

In the following, each of the above-mentioned processes will be described with flow diagrams. FIG. 3 shows the route guide condition input process S210, FIG. 4 shows the route guide information generation process S220, FIG. 5 shows the route guide map generation process S221, FIGS. 6 and 7 show the route guide sentence generation process S222, and FIG. 8 shows the route guide information output process S230.

In FIG. 3 which shows the route guide condition input process S210, when the route guide condition is input, the present position, the destination position and the output format are extracted, and the process goes to the process S220. If the present position, the destination position and the output format can not be extracted, the condition will be re-entered. In addition, it is determined whether the requested information is included in the route guide information which has been generated. If included, the process goes to the process S230, and the included information is extracted from the buffer data 204.

Figure 4:
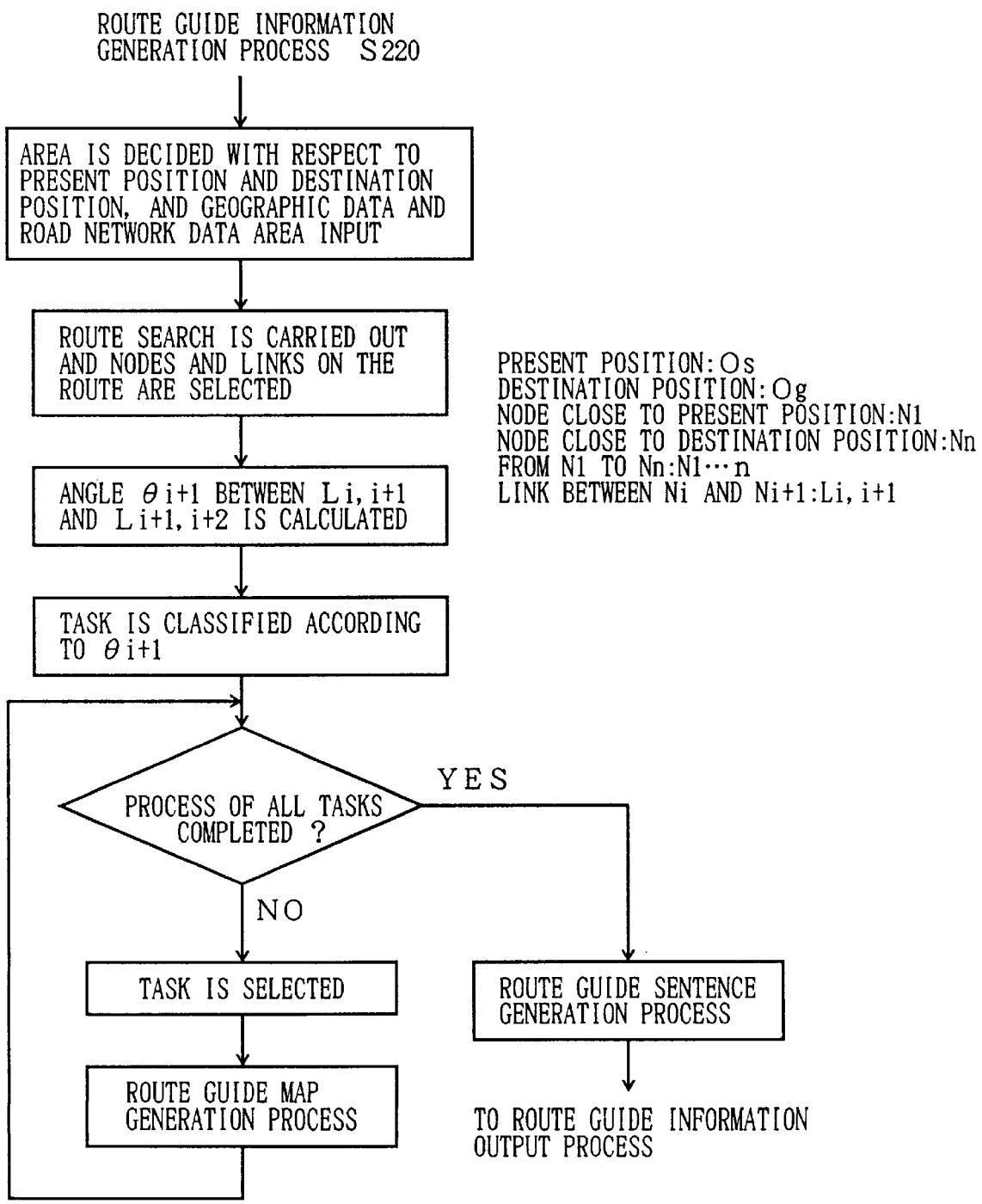
FIG. 4 is a flow diagram for explaining a route guide information generation process shown in FIG. 2.

In the process S220 which is shown in FIG. 4, necessary geographic data and road network data are input with respect to the present position and the destination position set in the process S210. Route search is carried out by using the road network data and nodes and links on the route are selected. At this time, the selected data is represented by symbols shown in FIG. 4. The symbols are, a present position: $O_s$, a destination position: $O_g$ a node close to the present position: N1, a node close to the destination position: Nn, nodes from N1 to Nn which are selected by the route search: N1 . . . n, and a link between Ni and Ni+1: Li,i+1. An angle between the links is calculated, and each task is determined according to whether an absolute value of φi+1 is larger than 22.5° or not, where φi+1 is an angle between Li,i+1 and Li+1,i+2. If the absolute value of φi+1 is larger than 22.5°, the type of the task is set as "relative representation". In addition, a link which includes N1 and N2 is also classified as an individual task, the type of which task is also set as "relative representation". Then, the route guide map generation process S221 and the route guide sentence generation process S222 are performed for each task classified in this manner. When the processes are completed for all tasks, the process goes to the route guide information output process S230.

Figure 5:
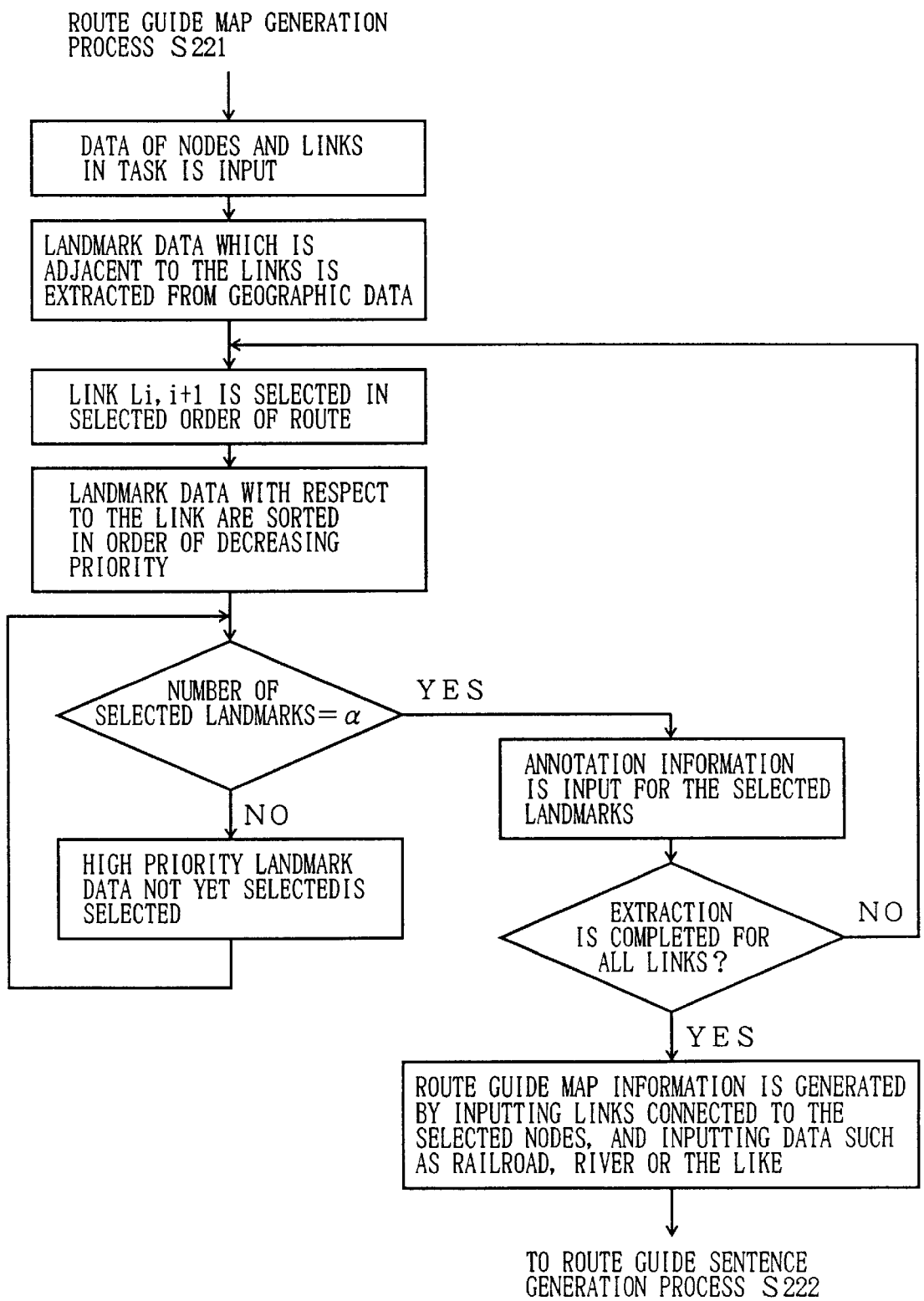
FIG. 5 is a flow diagram for explaining a route guide map generation process shown in FIG. 2.

As shown in FIG. 5 which is a flow diagram of the process S221, data of Ni and Li,i+1 are input, and landmark data which is adjacent to the links is extracted from the geographic data. That is, the links are selected in order of route configuration and the landmark data is set with respect to the links. At this time, priority is established for each landmark data based on the number of adjacent nodes, the attribute type, and the size such that the landmark data is selected in order of decreasing priority. In addition, the number of the landmarks to be selected (α) is established according to the data bounds, density (the number of the extracted landmarks) and the data location (including the present position and the destination position) within the task so as to determine particularity of the area of the task. Then, the landmarks are selected until the number reaches α (the selected landmarks with respect to Li,i+1 are represented as: Oij). After that, annotation information of the landmarks is input. This process is performed for every link data in a task. When the process is completed, the route guide map is generated by inputting links connected to the selected nodes, and inputting data such as a railroad, a river or the like, and, then, the process goes to the route guide sentence generation process S222.

FIG. 6 shows a flow diagram of the route guide sentence generation process S222. As shown in FIG. 6, all route guide map which is generated by the process S221 is input and the spatial object network data within the confines of the target area is input. Then, landmark data which is commonly included in the route guide map of each task is deleted. When deleting the commonly included data, data of the earlier task is left undeleted, but, if the last task has the common data, data is left undeleted in reverse order. The process for route guide sentence generation is performed for each tasks processed in this manner. If the type of the task is "relative representation", the process goes to a representation generating routine of relative position. If not, the position of the selected landmark data Oij with respect to the moving direction is determined by using the spatial object network data, that is, it is determined whether the landmark data is on the right side or the left side of the adjacent link. Then, the route guide sentence is formatted to be suitable for navigation and is output. For example, "Pass Oij on the right side and continue straight ahead" is output.

Figure 9:
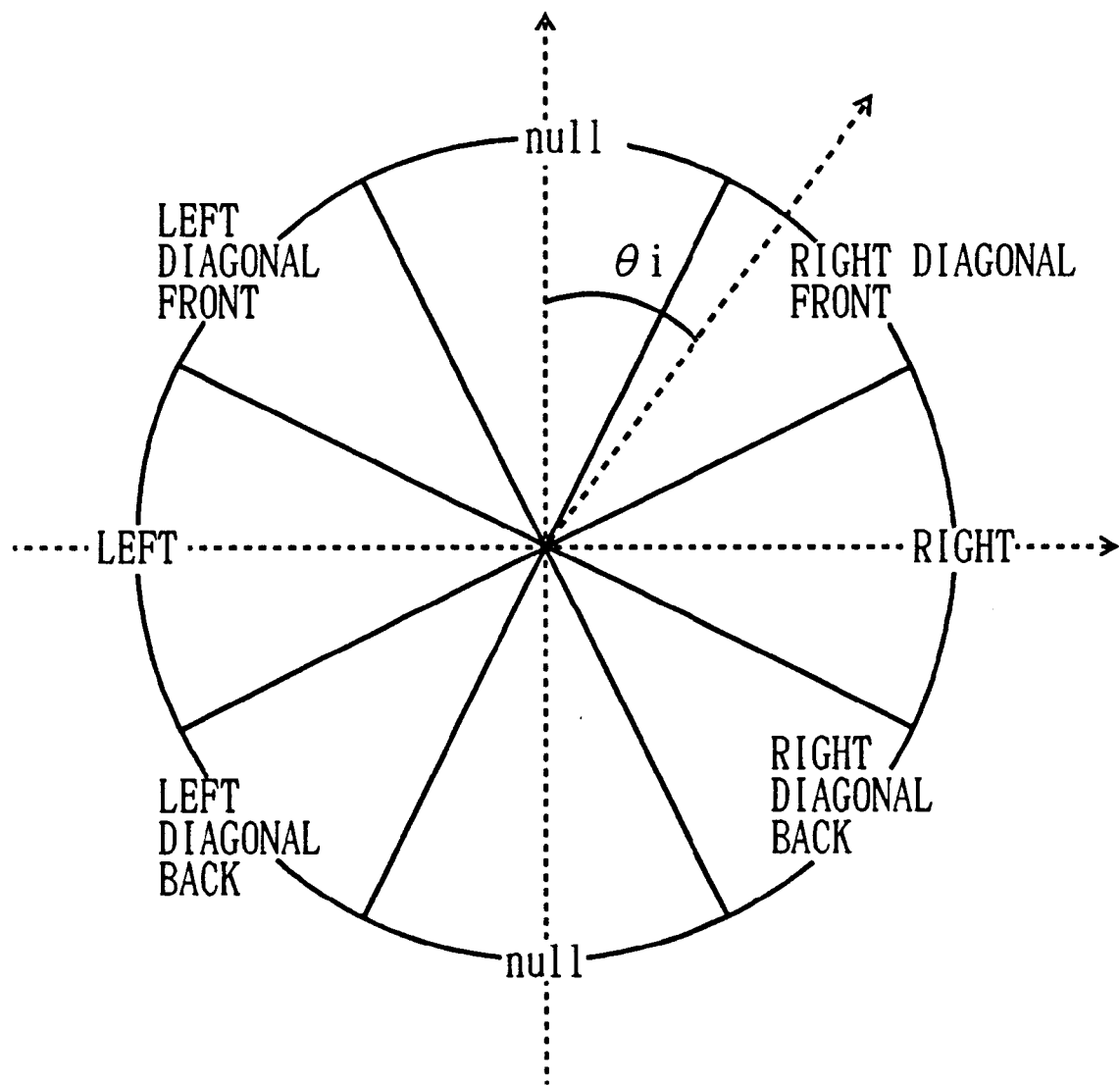
FIG. 9 is a diagram for explaining how a direction to which a link turns is converted into a word.
Figure 10A:
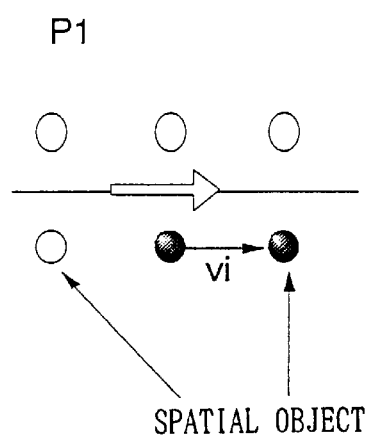
FIG. 10A is a diagram for explaining classification based on the spatial relationship between spatial objects with respect to the moving direction (P1)
Figure 10B:
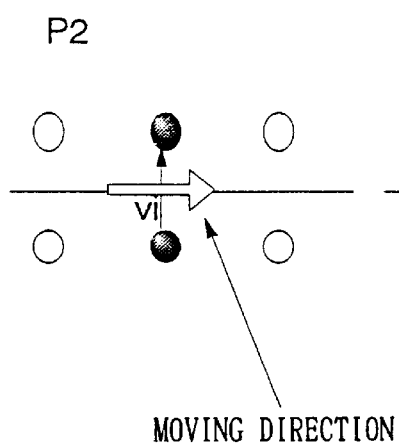
FIG. 10B is a diagram for explaining classification based on the spatial relationship between spatial objects with respect to the moving direction (P2)
Figure 10C:
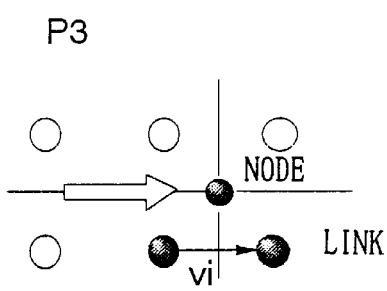
FIG. 10C is a diagram for explaining classification based on the spatial relationship between spatial objects with respect to the moving direction (P3)
Figure 11:
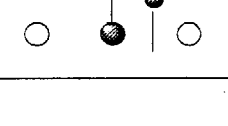
FIG. 11 is a diagram showing a combination of the patterns.
Figure 11:
Figure 11:
Figure 12:
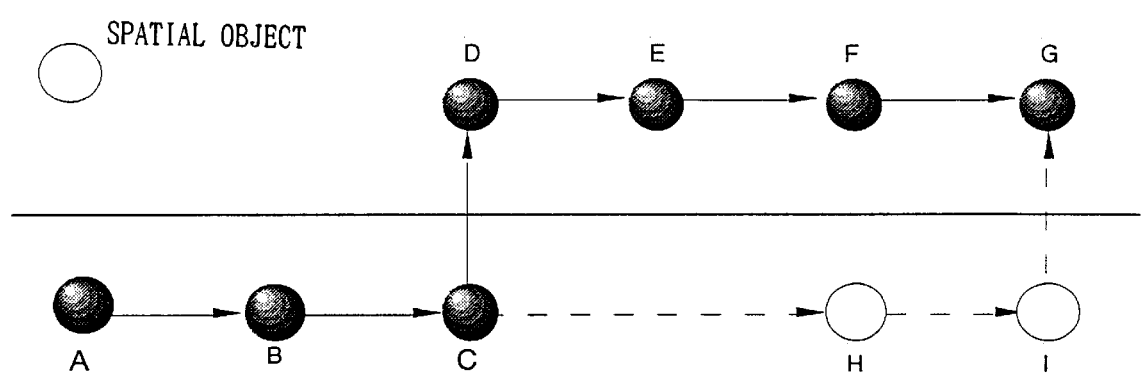
FIG. 12 is a diagram for explaining a correction which is performed on converted data.

FIG. 7 shows a flow diagram of the representation generating routine of relative position. As shown in FIG. 7, the angle φi+1 between Li,i+1 and Li+1,i+2 which are selected in the process S221 is calculated. Then, the angle is normalized by 22.5° and the direction to which the link turns is converted into a word. The method of the conversion is shown in FIG. 9. The word is assigned to a variable SDa. Next, Oij of high priority which is adjacent to Ni is input among the selected landmarks (when the task includes the destination position, Oij is the destination position). Then, routes of the spatial object network from other landmarks to the Oij are searched, and vectors V1 . . . m are assigned to the routes. The vectors V1 . . . m are classified into 3 patterns which are shown in FIGS. 10A, 10B, and 10C. As shown in the figures, the classification is based on the relation between the spatial objects with respect to the moving direction. Then, conversion to a word is performed according to a combination of the patterns. When m=1 (that is, when only V1 exists), for example, the relation is converted to "adjacent" in the case of P1 shown in FIG. 10A, "opposite" in the case of P2 shown in FIG. 10B, "across the way" in the case of P3 shown in FIG. 10C. In addition, the case of the combination (m=2) is shown in FIG. 11. For example, the relation in the case P1-P1(a) is converted into "two blocks down" which is the combination of "adjacent" and "adjacent", and the relation in the case P1-P2(b) is converted into "diagonal front" which is the combination of "adjacent" and "opposite". In this way, the combination of various m can be converted into various words. Next, a correction is performed on the converted data. FIG. 12 shows an example of the correction. In the case shown in FIG. 12, a linkage of ABCDEFG is extracted because of the lack of the spatial object network of C and H such that the linkage is converted to a representation of "three blocks away from the building opposite to the building two blocks away". The representation is corrected to a linkage of ABCHI, that is, "opposite to the building about five blocks away". Then, the corrected word is assigned to a variable SDr. The SDa and SDr generated in such a manner are formatted and output as the route guide sentence. For example, "turn right at a corner of Oi2 which is three blocks away from Oi1" is output. When the representation includes, for example, "three blocks away", and when the three buildings are not displayed due to lack of terminal's ability, the route guide sentence can complement these information.

FIG. 8 is a flow diagram of the route guide information output process S230. As shown in FIG. 8, the route guide map and the route guide sentence which are generated by the process S221 and the process S222 are stored as the buffer data 104. Then, guide information to be output is extracted from the buffer data and is converted so as to conform to the output format. In this case, deformation map representation conversion or three-dimensional map representation conversion is performed. As the deformation map representation conversion, for example, the method proposed in Japanese patent application No.9-4193 "METHOD FOR AUTOMATICALLY GENERATING DEFORMATION MAP AND DEVICE FOR AUTOMATICALLY GENERATING DEFORMATION MAP" may be used. In addition, for example, if the user's terminal can convert data to voice, the route guide sentence can be converted to a format applicable for voice output. The converted route guide information is output to the user.

According to the above-mentioned present invention, since the geographic data, the road network data, and the spatial object network data are provided, the route guide map and the route guide sentence for guiding the user from the present position to the destination position are automatically generated and provided to the user.

FIGS. 13A, 13B, 14A–14F, 15A–15c, and 16 are diagrams for explaining the above-mentioned processes by using actual data.

It is assumed that the requirement of the user has been set by the process S210 as the present position, the destination position, first task representation, deformation conversion of the route guide map, and voice output of the route guide sentence.

Figure 13A:
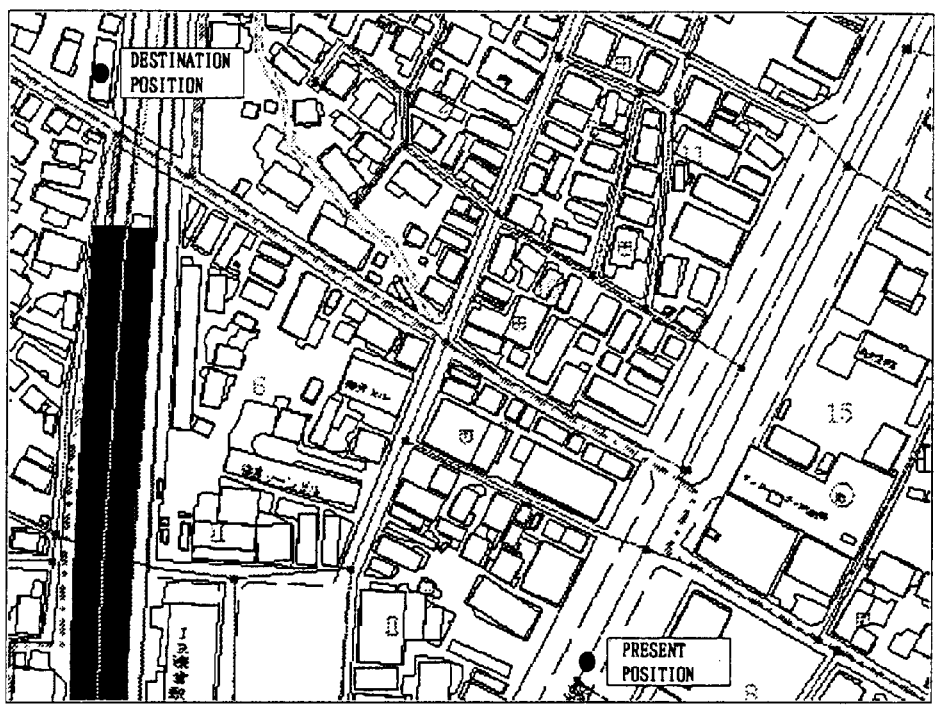
FIGS. 13A and 13B are diagrams showing the result of the route guide information generation process shown in FIG. 2 by using actual data.
Figure 13B:
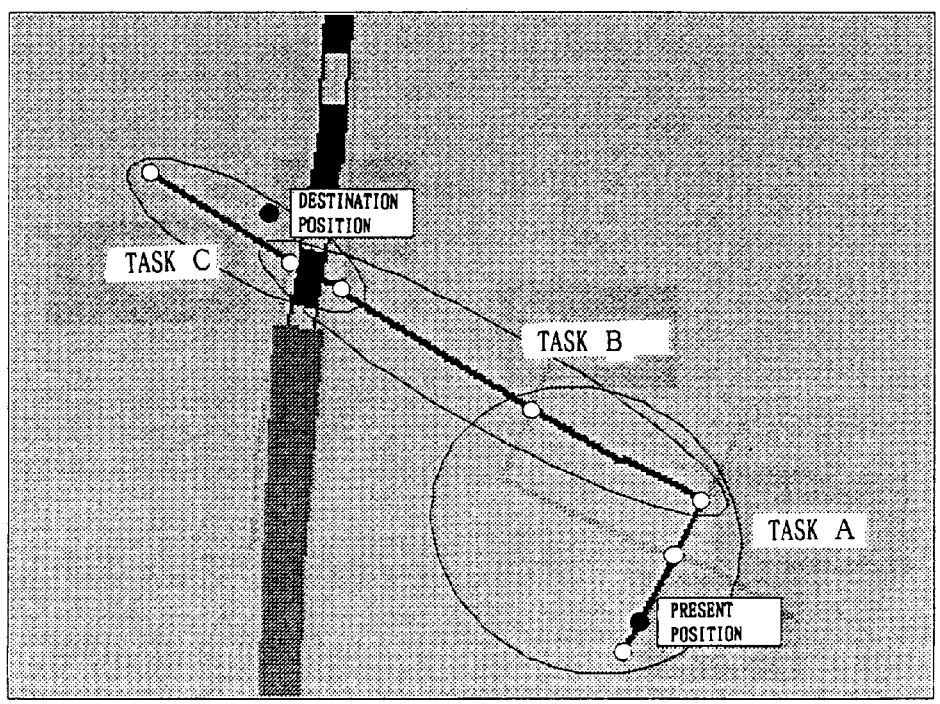

In the process S220, as shown in FIG. 13A, necessary geographic data and road network data are input with respect to the present position and the destination position set in S210. Then, route search is performed with respect to the input data and nodes and links on the route are selected. Then, the angle between each two links is calculated, and three tasks A, B, and C are determined on the basis of the angle and the link including N1 and N2 as shown in FIG. 13B. The route guide map and the route guide sentence are generated with respect to the tasks A, B, and C. The type of the tasks A and C is "relative representation".

In the process S221, data of Ni and Li,i+1 is input for every task, and landmark data adjacent to a link is extracted from the geographic data. Specifically, links are selected in the order of the route configuration and the landmark data is set. Priority of the landmark data is set on the basis of the number of adjacent nodes, attribute type, and the size such that the landmark data is selected in order of decreasing priority. For example, in the task A, landmarks are selected from the geographic data as shown in FIGS. 14A and 14B. Specifically, Kamakura Police, Kamakura Ninotori Parking, and Nikko are selected according to the priorities and the number of landmarks to be selected. Then, annotations and links connected to the selected nodes are input such that the route guide map is generated. In the same way, in terms of the task B, Nikko, Paresa, Sakura bank, and Taguchi Building are selected as the landmarks as shown in FIGS. 14C and 14D. As for the task C, Taguchi Building and Yasuda Seimei building are selected as landmarks as shown in FIGS. 14E and 14F such that the route guide map is generated.

Figure 15A:
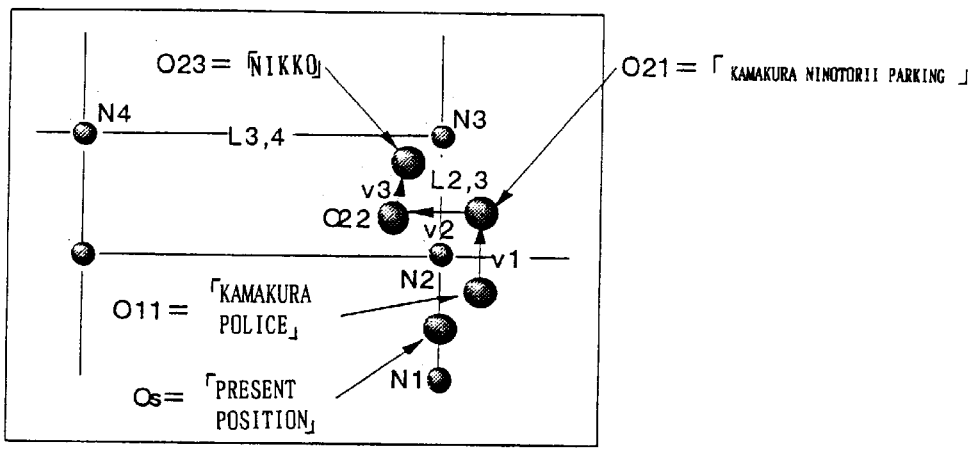
FIGS. 15A–15C are diagrams showing the result of the route guide sentence generation process shown in FIG. 2 by using actual data.
Figure 15B:
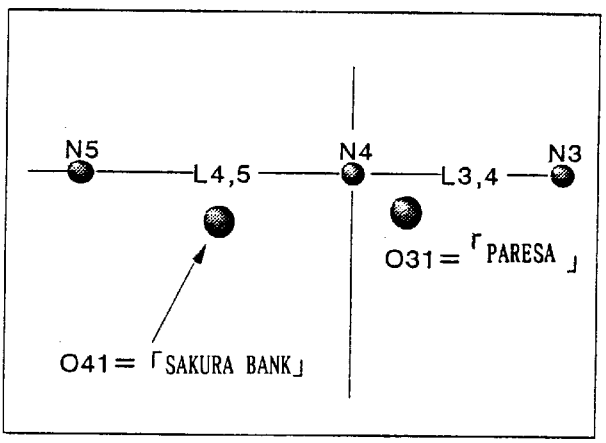
Figure 15C:
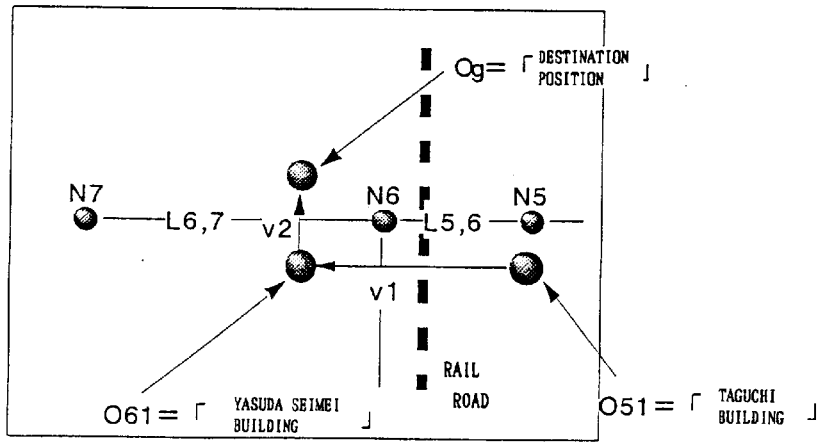

In the process S222, all route guide map generated in S221 are input and the spatial object network data within the confines of the target area is input. Then, landmark data which is commonly included in the route guide map of each task is deleted. In this case, Nikko which is commonly included in task A and B is deleted from the task B and Taguchi building which is commonly included in the task B and C is deleted from the task B. The route guide sentence is generated for each of the tasks. Specifically, as for the task A, the information is generated as shown in FIG. 15A because the type of the task A is "relative representation". That is, the angle between L2,3 and L3,4 is calculated such that SDa="left". Next, a high-priority landmark is selected as O23="Nikko" and routes of the spatial object network to other landmarks are searched. Then, vectors V1, V2, and V3 corresponding to the route are set wherein each of the vectors is matched to "relative representation". V1 which is classified as P1 is converted to "front", and V2 and V3 which are a combination of P1 and P2 are converted to "diagonal front", and, then, "front" and "diagonal front" are assigned to SDr. As a consequence, route guide sentence such as "On your right, pass by Kamakura Ninotorii Parking in front of Kamakura Police. Then, turn left at the corner of Nikko which is diagonally front of Kamakura Ninotorii Parking." is generated. As for the task B, as shown in FIG. 15B, the position of O31 with respect to L3,4 and the position of O41 with respect to L4,5 are calculated such that route guide sentence such as "pass by Paresa on your left, then, pass by Sakura Bank on your left and go straight ahead" is generated. As for the task C, since the type of the task is "relative representation", the route guide information is generated as shown in FIG. 15C. Specifically, the angle between L5,6 and L6,7 is calculated and "null" is assigned to SDa in this case. Next, a landmark of higher priority is selected as Og="destination position" and the routes of the spatial object network to other landmarks are searched. Then, vectors V1 and V2 are assigned to the routes wherein which vector is matched to "relative representation". V1 which is classified to P3, which means passing over a rail road in this case, is converted to "by the side of". V2 which is classified to P2 is converted to "opposite". Then, the results of conversion are assigned to SDr such that the route guide sentence such as "Your destination is opposite to Yasuda Seimei Building by the side of Taguchi Building" is generated.

Figure 16:
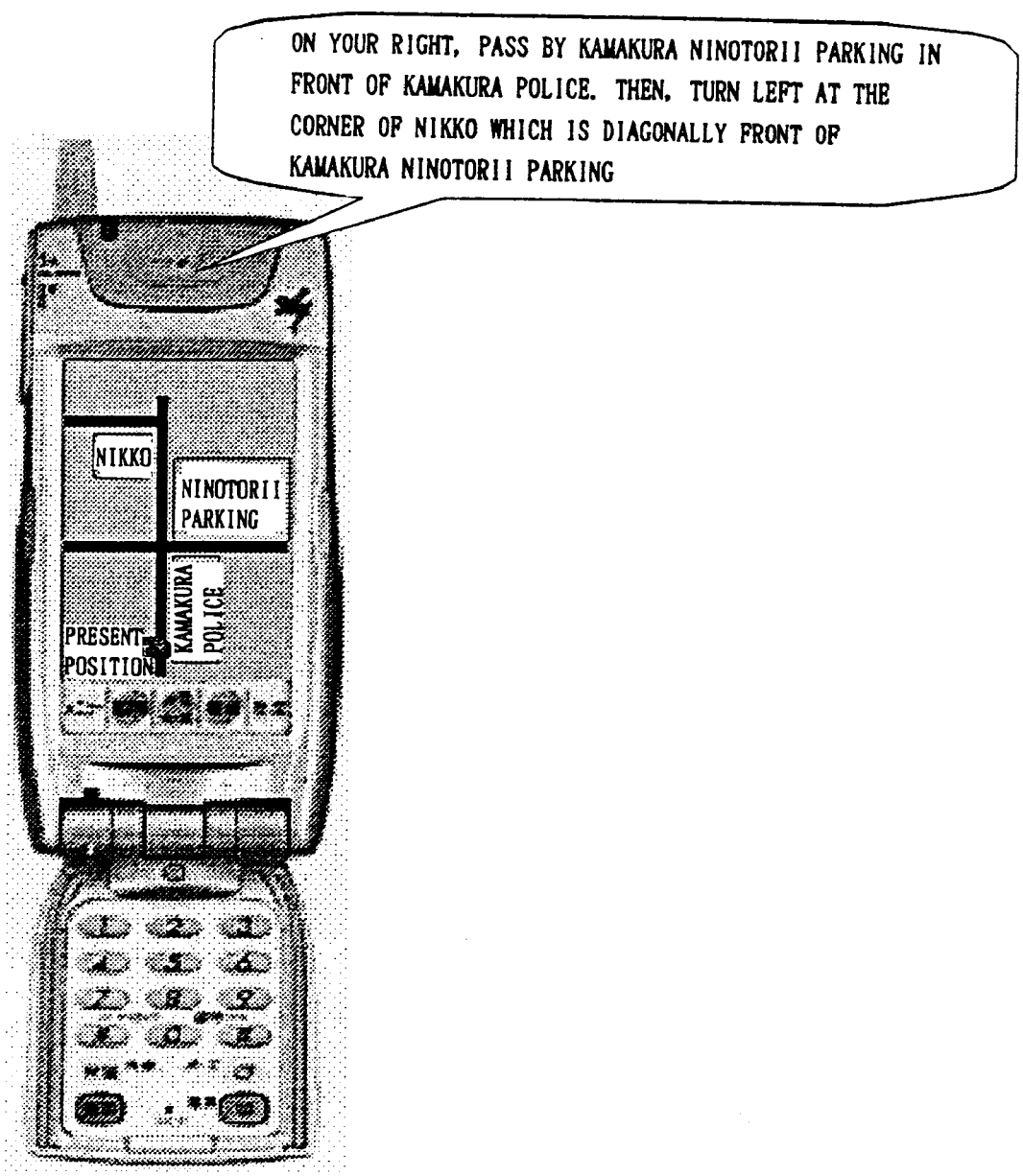
FIG. 16 is a diagram showing the result of the route guide information output process shown in FIG. 2 by using actual data.

In the route guide information output process S230, the route guide map and the route guide sentence which are generated by the route guide map generation process S221 and the route guide sentence generation process S222 respectively are stored as buffer data for each task. Then, information to be output is extracted and converted to a format suitable for outputting. Specifically, the settings are initial task displaying, deformation conversion of the route guide map, and voice output of the route guide sentence. Thus, conversions necessary for the settings are performed on the data. The converted guide information is output to the user. FIG. 16 shows the user's terminal which displays a deformation representation of the route guide map and outputs the route guide sentence by voice.

Figure 17:
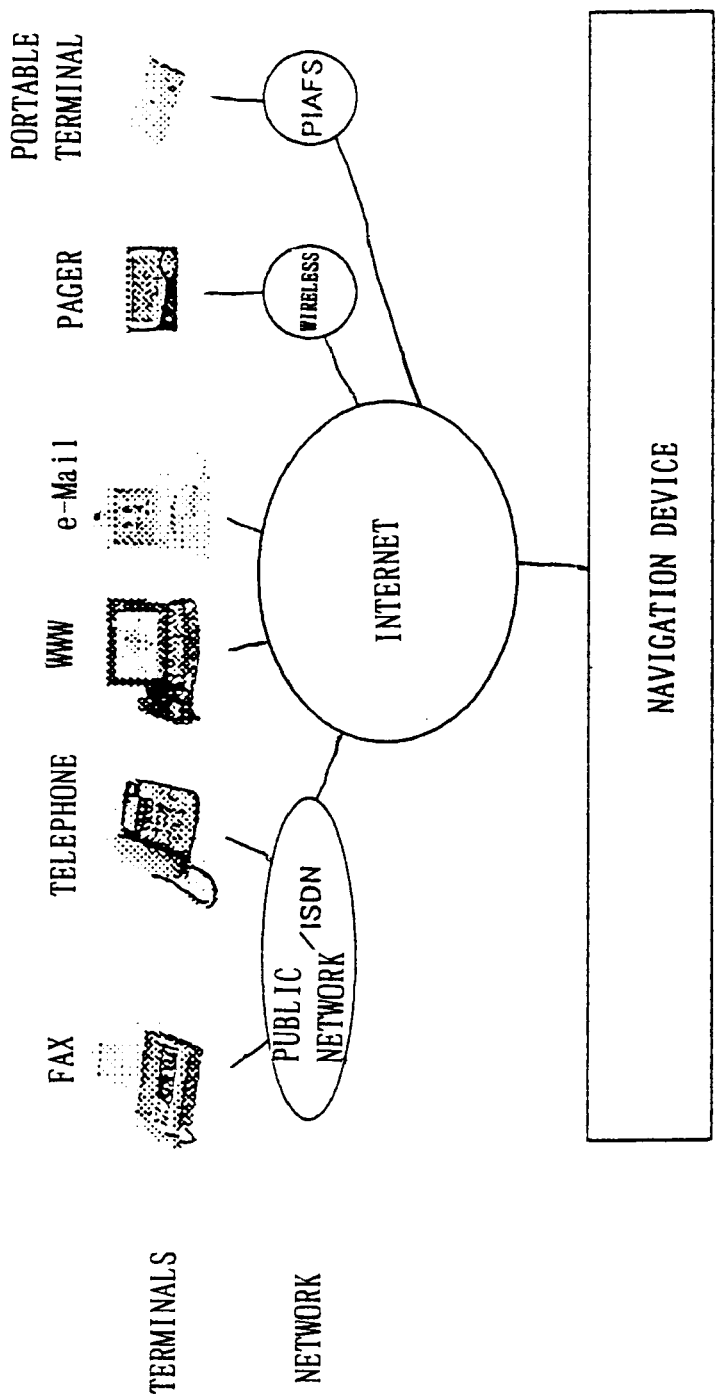
FIG. 17 is a block diagram showing a navigation system according to an embodiment of the present invention.

FIG. 17 shows an example of a navigation system which uses the method of the present invention. As shown in FIG. 17, a navigation device is connected to various networks such as an internet, a public network, a wireless network, a PIAFS network and the like. According to the configuration, various means can be used for navigation such as a FAX machine, a telephone, WWW, e-mail, a 2-way pager, a portable terminal shown in FIG. 16 and the like.

It is needless to say that a part or all of each processing part shown in FIG. 1, or the procedures shown in FIGS. 2–8 can be realized by computer programs. The programs for functioning as the processing parts or the programs for executing the procedures can be stored in a computer readable medium such as a FD (floppy disk), MO, ROM, a memory card, a CD, a DVD, a removable disk, and the like. The medium can be provided or distributed. In addition, the programs can be preinstalled in a computer.

According to the above-mentioned invention, the following effects are produced.

First, since the route guide map and the route guide sentence for guiding the user from the present position to the destination position can be automatically generated, manpower and cost can be decreased substantially.

Further, since particularity of the route guide map is determined according to the bounds of data and the density, a detailed route guide map for a area close to the destination or a heavily built-up area in which the user tends to get lost can be generated such that the user can clearly grasp the route information.

Further, since only necessary data for guiding the user to the destination position is selected from input data so as to decrease misleading information as much as possible, the user can clearly grasp the route information.

Further, since the route guide sentence includes the moving direction and the spatial relationship between the spatial objects which may be landmarks, the route can be grasped effectively and the possibility of choosing a false route can be decreased.

Further, since navigation is carried out by both of the route guide map and the route guide sentence so as to complement each other, the route can be grasped effectively and the possibility of choosing a false route can be decreased.

In addition, since the route guide map can be complemented by the route guide sentence, the amount of output data can be decreased as compared with outputting only detailed route information by visual map.

Furthermore, a navigation system can be realized by using a device which has the above-mentioned effects. Moreover, when the processes of the present invention are carried out by a computer, homogeneous output quality can be maintained, and a computer in which the program of the invention is installed can be used as the navigation device of the present invention.

The present invention is not limited to the specifically disclosed embodiments, and variations and modifications may be made without departing from the scope of the invention.

What is claimed is:

1. A navigation method for use in guiding a user from a present position to a destination position, comprising the steps of:

inputting information on said present position and said destination position;

inputting data from a geographic database and a road network database with respect to said information and selecting a route from said present position to said destination position;

determining particularity of route guide map according to the area and the density of data representing said selected route, selecting necessary data for guiding a user to said destination position according to said particularity and generating said route guide map;

inputting data corresponding to said area from a spatial object network database and generating route guide sentence corresponding to said route guide map, and manipulating information in said route guide map and route guide sentence and outputting said manipulated information.

2. The method as claimed in claim 1, wherein data which represents an area nearby said destination position or a dense area is selected as said necessary data.

3. The method as claimed in claim 1, wherein said necessary data is selected so as to reduce misleading information.

4. The method as claimed in claim 1, wherein the moving direction and the spatial relationship between the spatial objects which are landmarks are included in said route guide sentence when said route guide sentence is generated.

5. The method as claimed in claim 1, wherein said route guide map and said route guide sentence compliment each other.

6. The method as claimed in claim 1, wherein:

said route guide map is generated after determining that said particularity is low, and said route guide sentence is generated so as to complement said route guide map.

7. A method for generating route guide information for use in guiding a user from a present position to a destination position, comprising the steps of:

extracting said present position and destination position from a route guide condition;

inputting data from a geographic database and a road network database with respect to said information and selecting nodes and links on a route which is selected from said present position to said destination position;

calculating an angle between two connected links and classifying each link of said two connected links as a separate task, and generating said route guide information for each separate task.

8. The method as claimed in claim 7, wherein said step for generating said route guide information includes a step for generating a route guide map in which landmark data is selected in order of precedence until the number of said landmarks becomes a predetermined number.

9. The method as claimed in claim 8, wherein said step for generating said route guide information comprises the steps of:

deleting landmark data which is included commonly in said each task other than predetermined data;

calculating an angle between two links in selected order as a route and converting direction to which said links are turned into a word according to said angle;

inputting landmark data of high priority, extracting connections from other landmarks to said landmark data and classifying said connections as a plurality of patterns with respect to the moving direction, and converting a combination of said patterns into a word.

10. A navigation device for use in guiding a user from a present position to a destination position, comprising:

means for inputting information on said present position and said destination position;

means for inputting data from a geographic database and a road network database with respect to said information and selecting a route from said present position to said destination position;

means for determining particularity of route guide map according to the area and the density of data representing said selected route, selecting necessary data for guiding a user to said destination position according to said particularity and generating said route guide map;

means for inputting data corresponding to said area from a spatial object network database and generating route guide sentence with respect to said route guide map, and means for manipulating information in said route guide map and route guide sentence and outputting said manipulated information.

11. A navigation system for use in guiding a user from a present position to a destination position, comprising a navigation device, a network which is connected to said navigation device, and a plurality of terminals which can be connected to said network, said navigation device comprising:

means for selecting a route from said present position to said destination position by receiving input from said terminal;

means for determining particularity of route guide map according to the area and the density of data representing said selected route, selecting necessary data for guiding a user to said destination position according to said particularity and generating said route guide map;

means for generating route guide sentence with respect to said route guide map, and means outputting said route guide map and said route guide sentence.

12. A computer readable medium storing program code for causing a computer to perform navigation processing for use in guiding a user from a present position to a destination position, said computer readable medium comprising:

program code means for inputting information on said present position and said destination position;

program code means for inputting data from a geographic database and a road network database with respect to said information and selecting a route from said present position to said destination position;

program code means for determining particularity of route guide map according to the area and the density of data representing said selected route, selecting necessary data for guiding a user to said destination position according to said particularity and generating said route guide map;

program code means for inputting data corresponding to said area from a spatial object network database and generating route guide sentence with respect to said route guide map, and program code means for manipulating information in said route guide map and route guide sentence and outputting said manipulated information.

13. The computer readable medium as claimed in claim 12, wherein data which represents an area nearby said destination position or a dense area is selected as said necessary data.

14. The computer readable medium as claimed in claim 12, wherein said necessary data is selected so as to reduce misleading information.

15. The computer readable medium as claimed in claim 12, where in the moving direction and the spatial relationship between the spatial objects which are landmarks are included in said route guide sentence when said route guide sentence is generated.

16. The computer readable medium as claimed in claim 12, wherein said route guide map and said route guide sentence compliment each other.

17. The computer readable medium as claimed in claim 12, wherein:

said route guide map is generated after determining that said particularity is low, and said route guide sentence is generated so as to complement said route guide map.

* * * * *

UNITED STATES PATENT AND TRADEMARK OFFICE
CERTIFICATE OF CORRECTION

PATENT NO. : 6,256 581 B1
DATED : July 3, 2001
INVENTOR(S) : Kensaku Fujii et al.

It is certified that error appears in the above-identified patent and that said Letters Patent is hereby corrected as shown below:

Column 1,
Line 46, change "realizing" to -- realize --.

Column 7,
Line 54, change "tasks" to -- task --.

Column 8,
Line 40, change "these" to -- this --.
Line 65, change "15c" to -- 15C --.

Column 11,
Line 52, change "compliment" to -- complement --.

Column 14,
Line 14, change "compliment" to -- complement --.

Signed and Sealed this

Thirtieth Day of April, 2002

Attest:

JAMES E. ROGAN
*Attesting Officer*  *Director of the United States Patent and Trademark Office*